US009303999B2

(12) United States Patent
Hesch et al.

(10) Patent No.: US 9,303,999 B2
(45) Date of Patent: Apr. 5, 2016

(54) METHODS AND SYSTEMS FOR DETERMINING ESTIMATION OF MOTION OF A DEVICE

(71) Applicant: Google Technology Holdings LLC, Mountain View, CA (US)

(72) Inventors: Joel Hesch, Sunnyvale, CA (US); Johnny Lee, Sunnyvale, CA (US); Simon Lynen, Sunnyvale, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 96 days.

(21) Appl. No.: 14/143,043

(22) Filed: Dec. 30, 2013

(65) Prior Publication Data

US 2015/0185018 A1 Jul. 2, 2015

(51) Int. Cl.
| | |
|---|---|
| G01C 21/16 | (2006.01) |
| G06T 7/00 | (2006.01) |
| G06T 7/20 | (2006.01) |
| G06K 9/00 | (2006.01) |
| H04N 5/232 | (2006.01) |

(52) U.S. Cl.
CPC .......... *G01C 21/165* (2013.01); *G06K 9/00664* (2013.01); *G06T 7/0022* (2013.01); *G06T 7/0042* (2013.01); *G06T 7/2033* (2013.01); *G06T 7/2086* (2013.01); *G06T 2207/30244* (2013.01); *H04N 5/23254* (2013.01); *H04N 5/23258* (2013.01)

(58) Field of Classification Search
CPC .. G01C 21/16; G06K 9/00664; G06T 7/0042; G06T 7/0022; G06T 7/2086; G06T 2207/30244
See application file for complete search history.

(56) References Cited

U.S. PATENT DOCUMENTS

| | | | |
|---|---|---|---|
| 2003/0176970 A1 | 9/2003 | Lin | |
| 2004/0101047 A1 | 5/2004 | Yang | |
| 2009/0248304 A1* | 10/2009 | Roumeliotis et al. | 701/220 |
| 2011/0316980 A1* | 12/2011 | Dubbelman et al. | 348/47 |

(Continued)

FOREIGN PATENT DOCUMENTS

| | | |
|---|---|---|
| KR | 10-0944934 | 3/2010 |
| KR | 10-1241171 | 3/2013 |
| KR | 10-2013-0141404 | 12/2013 |

OTHER PUBLICATIONS

International Search Report and Written Opinion prepared by the Korean Patent Office in international patent application serial No. PCT/US2014/072467 mailed Mar. 13, 2015.

(Continued)

*Primary Examiner* — Mussa A Shaawat
*Assistant Examiner* — Thomas Ingram (57) ABSTRACT

Methods and systems for determining estimation of motion of a device are provided. An example method includes receiving data from an inertial measurement unit (IMU) of a device and receiving images from a camera of the device for a sliding time window. The method also includes determining an IMU estimation of motion of the device based on the data from the IMU, and a camera estimation of motion of the device based on feature tracking in the images. The method includes, based on the IMU estimation and the camera estimation having a difference more than a threshold amount, determining one or more of a position or a velocity of the device for the sliding time window, and determining an overall estimation of motion of the device as supported by the data from the IMU and the position or velocity of the device.

21 Claims, 8 Drawing Sheets

(56) References Cited

U.S. PATENT DOCUMENTS

| | | |
|---|---|---|
| 2012/0016623 A1 | 1/2012 | Hayner |
| 2014/0300732 A1* | 10/2014 | Friend et al. .................. 348/135 |
| 2014/0341465 A1* | 11/2014 | Li et al. ......................... 382/160 |
| 2015/0043784 A1* | 2/2015 | Flint et al. ..................... 382/106 |
| 2015/0049955 A1* | 2/2015 | Stoeffler et al. ............... 382/220 |
| 2015/0237479 A1 | 8/2015 | Fung et al. |

OTHER PUBLICATIONS

Hesch, Joel A. and Stergios I. Roumeliotis, "A Direct Least-Squares (DLS) Method for PnP", University of Minnesota, <http://www-users.cs.umn.edu/~joel/_files/Joel_Hesch_ICCV11.pdf>, Accessed Oct. 2, 2015.

* cited by examiner

METHODS AND SYSTEMS FOR DETERMINING ESTIMATION OF MOTION OF A DEVICE

BACKGROUND

Unless otherwise indicated herein, the materials described in this section are not prior art to the claims in this application and are not admitted to be prior art by inclusion in this section.

Sensor fusion includes combining sensor data or data derived from sensory data from independent sources such that resulting information is more complete. Data sources for a fusion process may include multiple distinct sensors. Each sensor may provide different information about the same object in an environment, or about the same location in an environment, for example. By combining the sensor data, a more complete depiction of the object or location can be provided. As an example, one sensor may include a camera to capture an image of an object, and another sensor may include location detection capabilities to determine a location of a device used to capture the image. By combining the sensor data, specific location information for the image data and device is provided.

SUMMARY

In one example, a method is provided comprising receiving data from an inertial measurement unit (IMU) of a device for a sliding time window, and receiving images from a camera of the device for the sliding time window. The method also comprises determining an IMU estimation of motion of the device based on the data from the IMU, and determining a camera estimation of motion of the device based on feature tracking in the images. The method also comprises based on the IMU estimation of motion of the device and the camera estimation of motion of the device having a difference more than a threshold amount, determining one or more of a position or a velocity of the device for the sliding time window, and determining an overall estimation of motion of the device for the sliding time window as supported by the data from the IMU and the one or more of the position or the velocity of the device.

In another example, a computer readable memory is provided that is configured to store instructions that, when executed by a device, cause the device to perform functions. The functions comprise receiving data from an inertial measurement unit (IMU) of the device for a sliding time window, and receiving images from a camera of the device for the sliding time window. The functions also comprise determining an IMU estimation of motion of the device based on the data from the IMU, and determining a camera estimation of motion of the device based on feature tracking in the images. The functions also comprise based on the IMU estimation of motion of the device and the camera estimation of motion of the device having a difference more than a threshold amount, determining one or more of a position or a velocity of the device for the sliding time window, and determining an overall estimation of motion of the device for the sliding time window as supported by the data from the IMU and the one or more of the position or the velocity of the device.

In another example, a device is provided that comprises one or more processors, and data storage configured to store instructions that, when executed by the one or more processors, cause the device to perform functions. The functions comprises receiving data from an inertial measurement unit (IMU) of the device for a sliding time window, and receiving images from a camera of the device for the sliding time window. The functions also comprise determining an IMU estimation of motion of the device based on the data from the IMU, and determining a camera estimation of motion of the device based on feature tracking in the images. The functions also comprise based on the IMU estimation of motion of the device and the camera estimation of motion of the device having a difference more than a threshold amount, determining one or more of a position or a velocity of the device for the sliding time window, and determining an overall estimation of motion of the device for the sliding time window as supported by the data from the IMU and the one or more of the position or the velocity of the device.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, methods and systems for determining estimation of motion of a device are described. An example method includes receiving data from an inertial measurement unit (IMU) of a device for a sliding time window and receiving images from a camera of the device for the sliding time window. The method also includes determining an IMU estimation of motion of the device based on the data from the IMU and determining a camera estimation of motion of the device based on feature tracking in the images. Based on the IMU estimation of motion of the device and the camera estimation of motion of the device having a difference more than a threshold amount, the method includes determining one or more of a position or a velocity of the device for the sliding time window, and determining an overall estimation of motion of the device for the sliding time window as supported by the data from the IMU and the one or more of the position or the velocity of the device. Example methods may use data from sensors of a moving device to estimate change in position of the device over time, which may be referred to as odometry. Estimates of position of the device may be relative to a known or artificial starting location.

Figure 1:
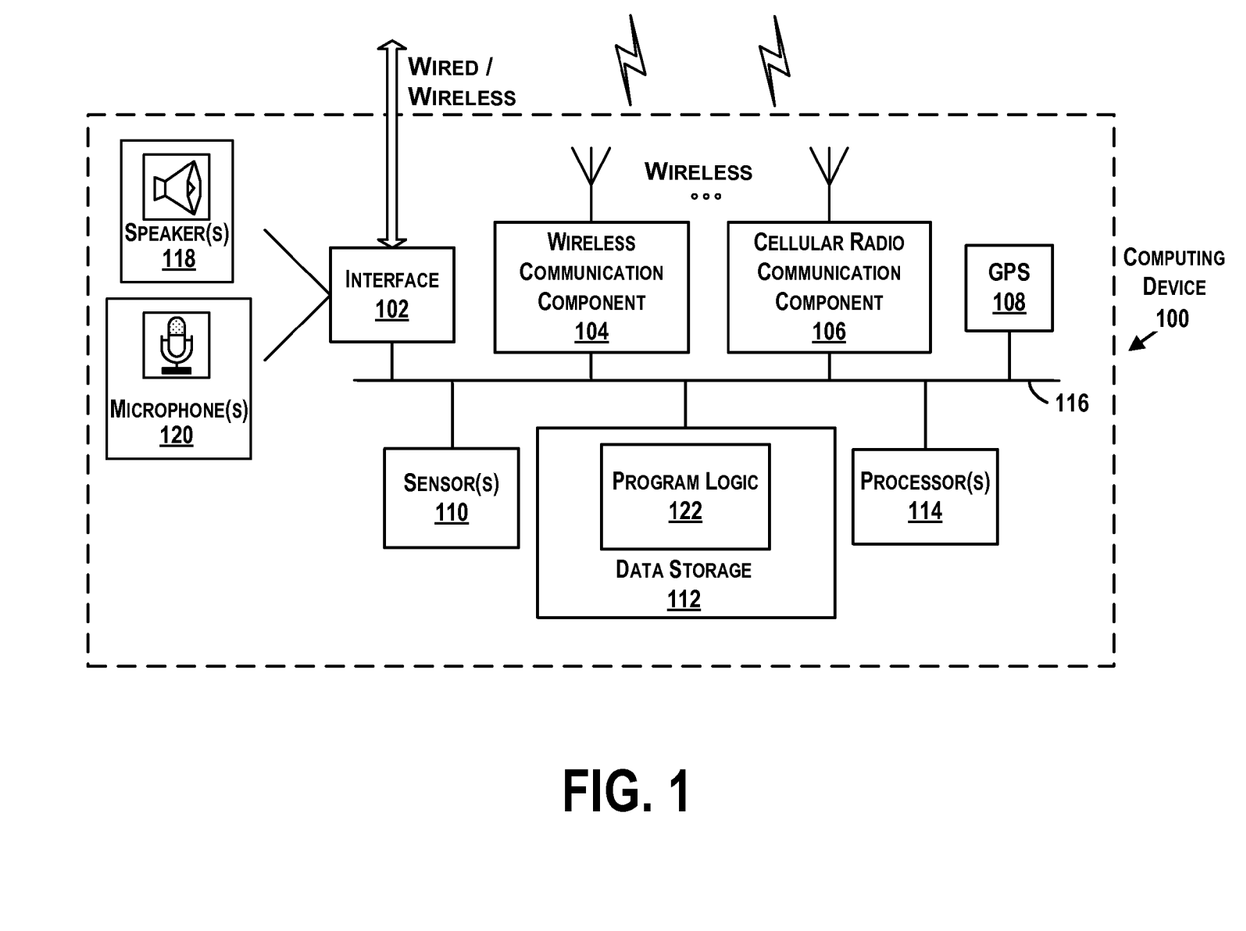
FIG. 1 illustrates an example computing device.

Referring now to the figures, FIG. 1 illustrates an example computing device 100. In some examples, components illustrated in FIG. 1 may be distributed across multiple computing devices. However, for the sake of example, the components are shown and described as part of one example computing device 100. The computing device 100 may be or include a mobile device (such as a mobile phone), desktop computer, laptop computer, email/messaging device, tablet computer, or similar device that may be configured to perform the functions described herein. Generally, the computing device 100 may be any type of computing device or transmitter that is configured to transmit data or receive data in accordance with methods and functions described herein.

The computing device 100 may include an interface 102, a wireless communication component 104, a cellular radio communication component 106, a global position system (GPS) receiver 108, sensor(s) 110, data storage 112, and processor(s) 114. Components illustrated in FIG. 1 may be linked together by a communication link 116. The computing device 100 may also include hardware to enable communication within the computing device 100 and between the computing device 100 and other computing devices (not shown), such as a server entity. The hardware may include transmitters, receivers, and antennas, for example.

The interface 102 may be configured to allow the computing device 100 to communicate with other computing devices (not shown), such as a server. Thus, the interface 102 may be configured to receive input data from one or more computing devices, and may also be configured to send output data to the one or more computing devices. The interface 102 may be configured to function according to a wired or wireless communication protocol. In some examples, the interface 102 may include buttons, a keyboard, a touchscreen, speaker(s) 118, microphone(s) 120, and/or any other elements for receiving inputs, as well as one or more displays, and/or any other elements for communicating outputs.

The wireless communication component 104 may be a communication interface that is configured to facilitate wireless data communication for the computing device 100 according to one or more wireless communication standards. For example, the wireless communication component 104 may include a wi-Fi communication component that is configured to facilitate wireless data communication according to one or more IEEE 802.11 standards. As another example, the wireless communication component 104 may include a Bluetooth communication component that is configured to facilitate wireless data communication according to one or more Bluetooth standards. Other examples are also possible.

The cellular radio communication component 106 may be a communication interface that is configured to facilitate wireless communication (voice and/or data) with a cellular wireless base station to provide mobile connectivity to a network. The cellular radio communication component 106 may be configured to connect to a base station of a cell in which the computing device 100 is located, for example.

The GPS receiver 108 may be configured to estimate a location of the computing device 100 by precisely timing signals sent by GPS satellites.

The sensor(s) 110 may include one or more sensors, or may represent one or more sensors included within the computing device 100. Example sensors include an accelerometer, gyroscope, pedometer, light sensors, microphone, camera(s), infrared flash, barometer, magnetometer, GPS, WiFi, near field communication (NFC), Bluetooth, projector, depth sensor, temperature sensors, or other location and/or context-aware sensors.

The data storage 112 may store program logic 122 that can be accessed and executed by the processor(s) 114. The data storage 112 may also store data collected by the sensor(s) 110, or data collected by any of the wireless communication component 104, the cellular radio communication component 106, and the GPS receiver 108.

The processor(s) 114 may be configured to receive data collected by any of sensor(s) 110 and perform any number of functions based on the data. As an example, the processor(s) 114 may be configured to determine one or more geographical location estimates of the computing device 100 using one or more location-determination components, such as the wireless communication component 104, the cellular radio communication component 106, or the GPS receiver 108. The processor(s) 114 may use a location-determination algorithm to determine a location of the computing device 100 based on a presence and/or location of one or more known wireless access points within a wireless range of the computing device 100. In one example, the wireless location component 104 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 100 may be determined.

In another instance, the processor(s) 114 may use a location-determination algorithm to determine a location of the computing device 100 based on nearby cellular base stations. For example, the cellular radio communication component 106 may be configured to identify a cell from which the computing device 100 is receiving, or last received, signal from a cellular network. The cellular radio communication component 106 may also be configured to measure a round trip time (RTT) to a base station providing the signal, and combine this information with the identified cell to determine a location estimate. In another example, the cellular communication component 106 may be configured to use observed time difference of arrival (OTDOA) from three or more base stations to estimate the location of the computing device 100.

In some implementations, the computing device 100 may include a device platform (not shown), which may be configured as a multi-layered Linux platform. The device platform may include different applications and an application framework, as well as various kernels, libraries, and runtime entities. In other examples, other formats or operating systems may operate the computing g device 100 as well.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

The computing device 100 may include more or fewer components. Further, example methods described herein may be performed individually by components of the computing device 100, or in combination by one or all of the components of the computing device 100.

Figure 2:
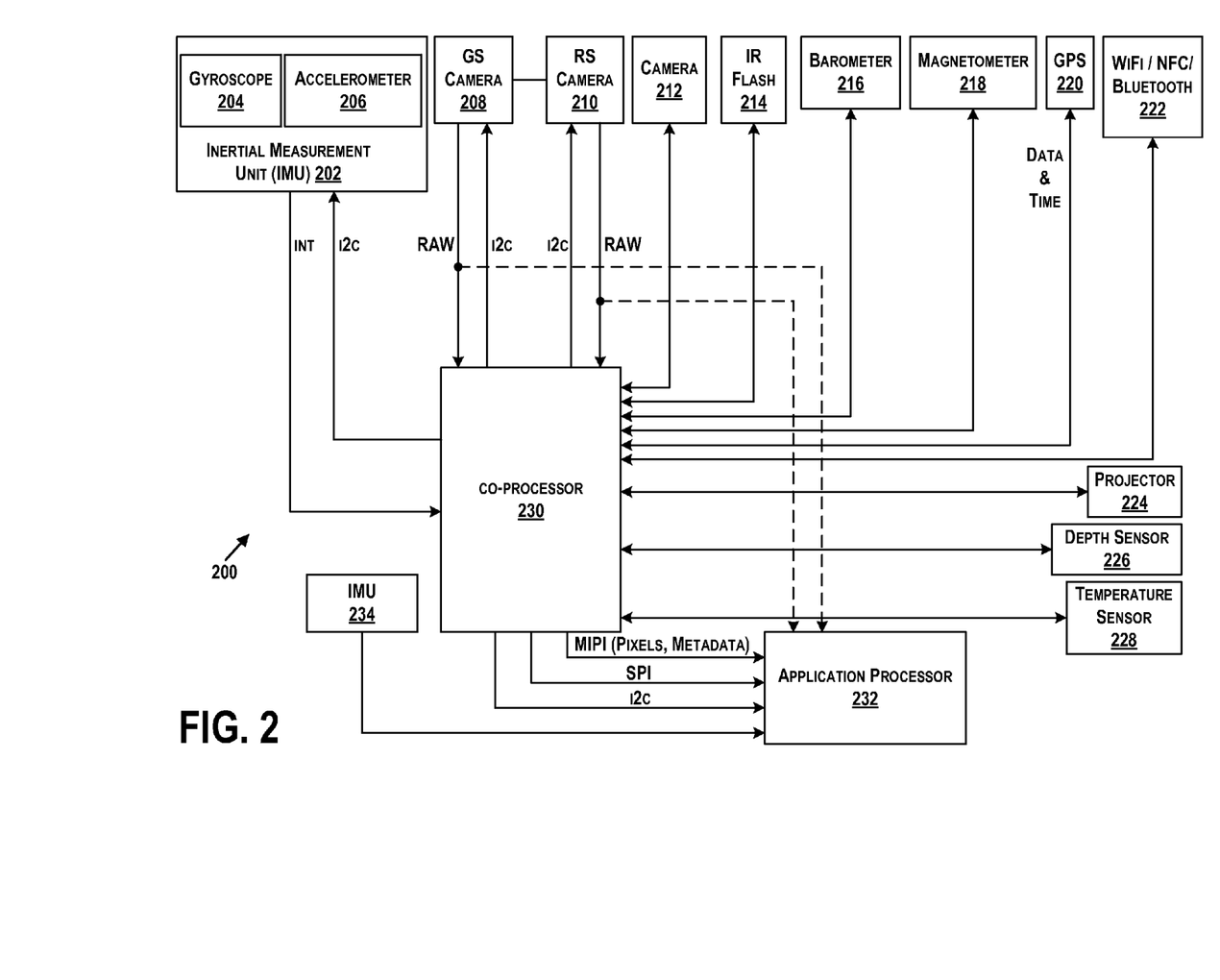
FIG. 2 illustrates another example computing device.

FIG. 2 illustrates another example computing device 200. The computing device 200 in FIG. 2 may be representative of a portion of the computing device 100 shown in FIG. 1. In FIG. 2, the computing device 200 is shown to include a number of sensors such as an inertial measurement unit (IMU) 202 including a gyroscope 204 and an accelerometer 206, a global shutter (GS) camera 208, a rolling shutter (RS) camera 210, a front facing camera 212, an infrared (IR) flash 214, a barometer 216, a magnetometer 218, a GPS receiver 220, a WiFi/NFC/Bluetooth sensor 222, a projector 224, a depth sensor 226, and a temperature sensor 228, each of which outputs to a co-processor 230. The co-processor 230 receives input from and outputs to an application processor 232. The computing device 200 may further include a second IMU 234 that outputs directly to the application processor 232.

The IMU 202 may be configured to determine a velocity, orientation, and gravitational forces of the computing device 200 based on outputs of the gyroscope 204 and the accelerometer 206.

The GS camera 208 may be configured on the computing device 200 to be a rear facing camera, so as to face away from a front of the computing device 200. The GS camera 208 may be configured to read outputs of all pixels of the camera 208 simultaneously. The GS camera 208 may be configured to have about a 120-170 degree field of view, such as a fish eye sensor, for wide-angle viewing.

The RS camera 210 may be configured to read outputs of pixels from a top of the pixel display to a bottom of the pixel display. As one example, the RS camera 210 may be a red/green/blue (RGB) infrared (IR) 4 megapixel image sensor, although other sensors are possible as well. The RS camera 210 may have a fast exposure so as to operate with a minimum readout time of about 5.5 ms, for example. Like the GS camera 208, the RS camera 210 may be a rear facing camera.

The camera 212 may be an additional camera in the computing device 200 that is configured as a front facing camera, or in a direction facing opposite of the GS camera 208 and the RS camera 210. The camera 212 may be configured to capture images of a first viewpoint of the computing device 200 and the GS camera 208 and the RS camera 210 may be configured to capture images of a second viewpoint of the device that is opposite the first viewpoint. The camera 212 may be a wide angle camera, and may have about a 120-170 degree field of view for wide angle viewing, for example.

The IR flash 214 may provide a light source for the computing device 200, and may be configured to output light in a direction toward a rear of the computing device 200 so as to provide light for the GS camera 208 and RS camera 210, for example. In some examples, the IR flash 214 may be configured to flash at a low duty cycle, such as 5 Hz, or in a non-continuous manner as directed by the co-processor 230 or application processor 232. The IR flash 214 may include an LED light source configured for use in mobile devices, for example.

Figure 3A:
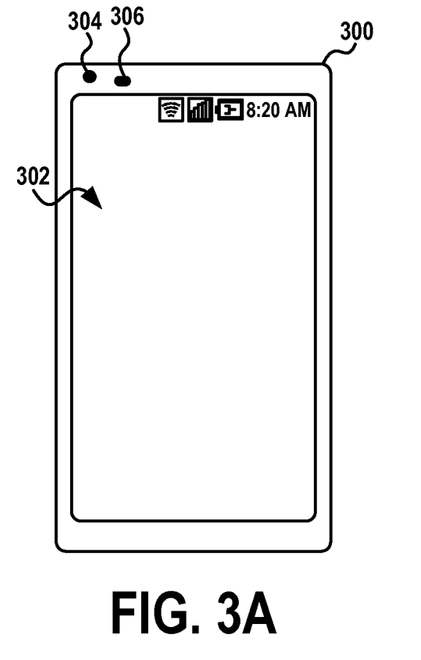
FIGS. 3A-3B are conceptual illustrations of a computing device that show a configuration of some sensors of the computing device in FIG. 2.
Figure 3B:
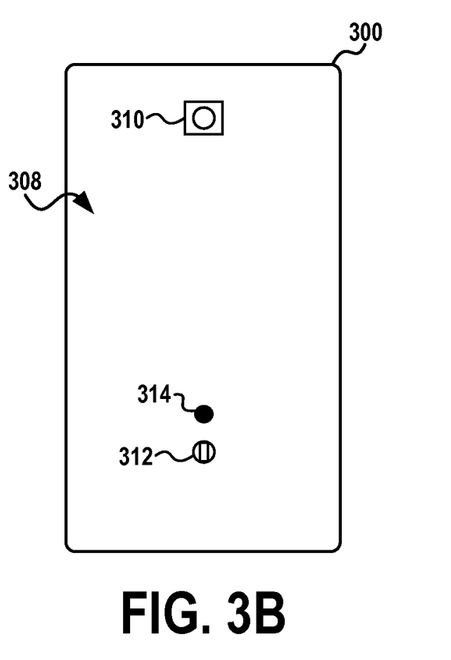

FIGS. 3A-3B are conceptual illustrations of a computing device 300 that show a configuration of some sensors of the computing device 200 in FIG. 2. In FIGS. 3A-3B, the computing device 300 is shown as a mobile phone. The computing device 300 may be similar to either of computing device 100 in FIG. 1 or computing device 200 in FIG. 2. FIG. 3A illustrates a front of the computing device 300 in which a display 302 is provided, along with a front facing camera 304, and a P/L sensor opening 306 (e.g., a proximity or light sensor). The front facing camera 304 may be the camera 212 as described in FIG. 2.

FIG. 3B illustrates a back 308 of the computing device 300 in which a rear camera 310 and another rear camera 314 are provided. The rear camera 310 may be the RS camera 210 and the rear camera 312 may be the GS camera 208, as described in the computing device 200 in FIG. 2. The back 308 of the computing device 300 also includes an IR-flash 314, which may be the IR flash 214 or the projector 224 as described in the computing device 200 in FIG. 2. In one example, the IR flash 214 and the projector 224 may be one in the same. For instance, a single IR flash may be used to perform the functions of the IR flash 214 and the projector 224. In another example, the computing device 300 may include a second flash (e.g., an LED flash) located near the rear camera 310 (not shown). A configuration and placement of the sensors may be helpful to provide desired functionality of the computing device 300, for example, however other configurations are possible as well.

Referring back to FIG. 2, the barometer 216 may include a pressure sensor, and may be configured to determine air pressures and altitude changes.

The magnetometer 218 may be configured to provide roll, yaw, and pitch measurements of the computing device 200, and can be configured to operate as an internal compass, for example. In some examples, the magnetometer 218 may be a component of the IMU 202 (not shown).

The GPS receiver 220 may be similar to the GPS receiver 108 described in the computing device 100 of FIG. 1. In further examples, the GPS 220 may also output timing signals as received from GPS satellites or other network entities. Such timing signals may be used to synchronize collected data from sensors across multiple devices that include the same satellite timestamps.

The WiFi/NFC/Bluetooth sensor 222 may include wireless communication components configured to operate according to WiFi and Bluetooth standards, as discussed above with the computing device 100 of FIG. 1, and according to NFC standards to establish wireless communication with another device via contact or coming into close proximity with the other device.

The projector 224 may be or include a structured light projector that has a laser with a pattern generator to produce a dot pattern in an environment. The projector 224 may be configured to operate in conjunction with the RS camera 210 to recover information regarding depth of objects in the environment, such as three-dimensional (3D) characteristics of the objects. For example, the separate depth sensor 226 may be configured to capture video data of the dot pattern in 3D under ambient light conditions to sense a range of objects in the environment. The projector 224 and/or depth sensor 226 may be configured to determine shapes of objects based on the projected dot pattern. By way of example, the depth sensor 226 may be configured to cause the projector 224 to produce a dot pattern and cause the RS camera 210 to capture an image of the dot pattern. The depth sensor 226 may then process the image of the dot pattern, use various algorithms to triangulate and extract 3D data, and output a depth image to the co-processor 230.

The temperature sensor 228 may be configured to measure a temperature or temperature gradient, such as a change in temperature, for example, of an ambient environment of the computing device 200.

The co-processor 230 may be configured to control all sensors on the computing device 200. In examples, the co-processor 230 may control exposure times of any of cameras 208, 210, and 212 to match the IR flash 214, control the projector 224 pulse sync, duration, and intensity, and in general, control data capture or collection times of the sensors. The co-processor 230 may also be configured to process data from any of the sensors into an appropriate format for the application processor 232. In some examples, the co-processor 230 merges all data from any of the sensors that corresponds to a same timestamp or data collection time (or time period) into a single data structure to be provided to the application processor 232.

The application processor 232 may be configured to control other functionality of the computing device 200, such as to control the computing device 200 to operate according to an operating system or any number of software applications stored on the computing device 200. The application processor 232 may use the data collected by the sensors and received from the co-processor to perform any number of types of functionality. The application processor 232 may receive outputs of the co-processor 230, and in some examples, the application processor 232 may receive raw data outputs from other sensors as well, including the GS camera 208 and the RS camera 210.

The second IMU 234 may output collected data directly to the application processor 232, which may be received by the application processor 232 and used to trigger other sensors to begin collecting data. As an example, outputs of the second IMU 234 may be indicative of motion of the computing device 200, and when the computing device 200 is in motion, it may be desired to collect image data, GPS data, etc. Thus, the application processor 232 can trigger other sensors through communication signaling on common buses to collect data at the times at which the outputs of the IMU 234 indicate motion.

The computing device 200 shown in FIG. 2 may include a number of communication buses between each of the sensors and processors. For example, the co-processor 230 may communicate with each of the IMU 202, the GS camera 208, and the RS camera 212 over an inter-integrated circuit (I2C) bus that includes a multi-master serial single-ended bus for communication. The co-processor 230 may receive raw data collected, measured, or detected by each of the IMU 202, the GS camera 208, and the RS camera 212 over the same I2C bus or a separate communication bus. The co-processor 230 may communicate with the application processor 232 over a number of communication buses including a serial peripheral interface (SPI) bus that includes a synchronous serial data link that may operate in full duplex mode, the I2C bus, and a mobile industry processor interface (MIPI) that includes a serial interface configured for communicating camera or pixel information. Use of various buses may be determined based on need of speed of communication of data as well as bandwidth provided by the respective communication bus, for example.

Within examples herein, the computing device 200 may collect data as the computing device 200 moves through an environment, and may be configured to perform odometry functions. Odometry includes use of data from sensors that are moving to estimate a change in position over time. Odometry can be used to estimate a position of the computing device 200 relative to a starting location so as to determine a trajectory or pathway of the computing device 200. In some examples, a sliding window of sensor data can be processed as the device moves through the environment to determine a path traversed by the computing device 200.

Figure 4:
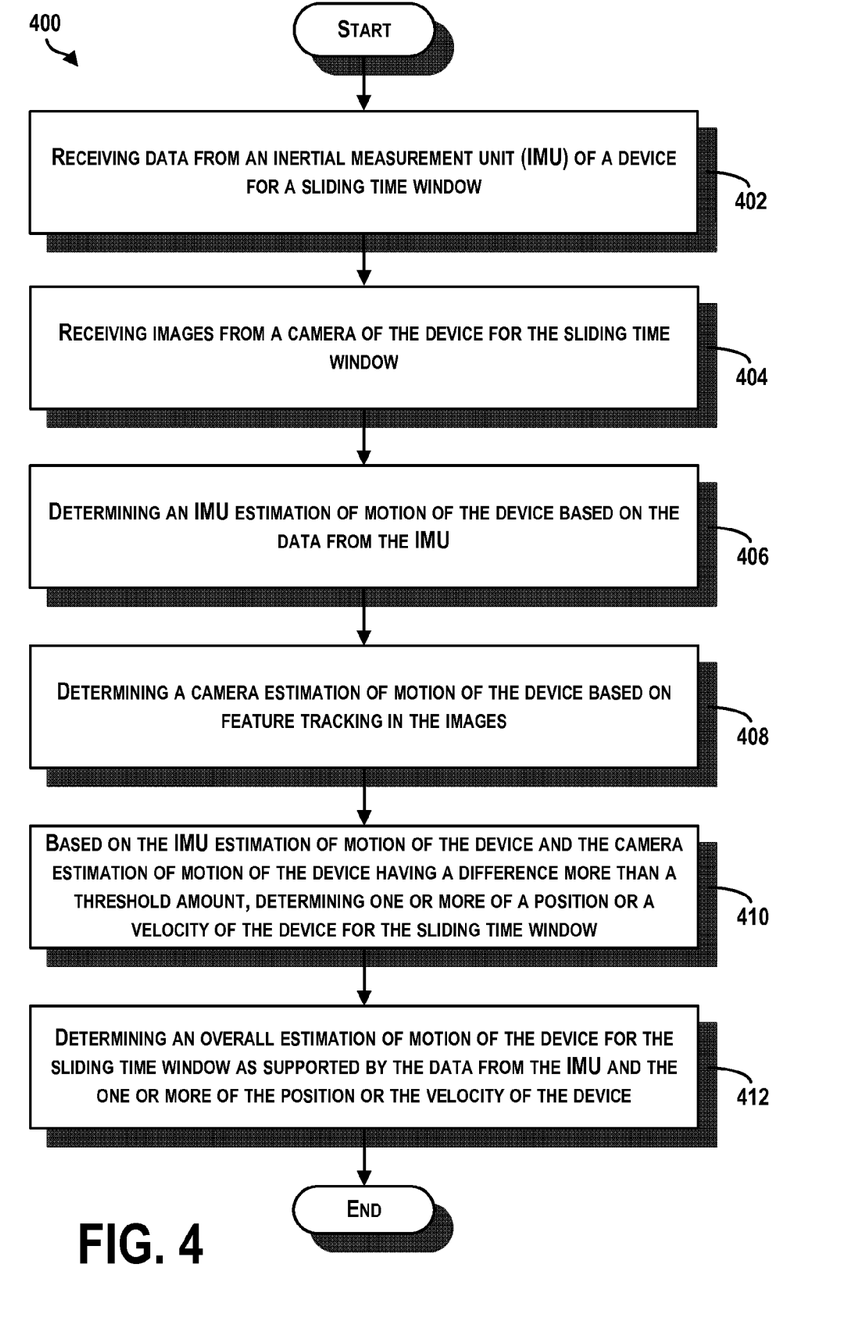
FIG. 4 is a block diagram of an example method for determining estimation of motion of a device, in accordance with at least some embodiments described herein.

FIG. 4 is a block diagram of an example method for determining estimation of motion of a device, in accordance with at least some embodiments described herein. Method 400 shown in FIG. 4 presents an embodiment of a method that, for example, could be used with the computing device 100 in FIG. 1, the computing device 200 in FIG. 2, or the computing device 300 in FIG. 3, for example, or may be performed by a combination of any components of the computing device 100 in FIG. 1, the computing device 200 in FIG. 2, or the computing device 300 in FIG. 3. Method 400 may include one or more operations, functions, or actions as illustrated by one or more of blocks 402-412. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include other non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. The program code (or data for the code) may also be stored or provided on other media including communication media, such as a wireless communication media, for example.

In addition, for the method 400 and other processes and methods disclosed herein, each block in FIG. 4 may represent circuitry that is wired to perform the specific logical functions in the process.

Functions of the method 400 may be fully performed by a computing device, or may be distributed across multiple computing devices and/or a server. In some examples, the computing device may receive information from sensors of the computing device, or where the computing device is a server the information can be received from another device that collects the information. The computing device could further communicate with a server to receive information from sensors of other devices, for example. The method 400 may further be performed by a device that has an application processor configured to function based on an operating system and a co-processor configured to receive data from a plurality of sensors of the device. The sensors may include any sensors as described above in any of FIG. 1, FIG. 2, or FIGS. 3A-3B, for example, including an IMU, a global shutter camera, a rolling shutter camera, a structured light projector, a depth camera, an infrared flash, a barometer, a magnetometer, and a temperature sensor.

At block 402, the method 400 includes receiving data from an inertial measurement unit (IMU) of a device for a sliding time window. A processor of the device may receive the data, which may indicate three degrees of freedom position (e.g., along x axis, y axis, and z axis) and three degrees of freedom orientation (e.g., roll, pitch, yaw) of the device. The IMU data may be representative of motion of the device over the sliding time window. The data may be collected by the IMU over any given time period, and in some examples, the IMU may continuously collect data. In some instances, the sliding time window may indicate the time during which the IMU collects data. Or, such as in examples when the IMU continuously collects data, the sliding time window may indicate the time period for which the processor receives the IMU data.

The sliding time window includes an amount of time with respect to a current timeframe. In one example, a time window may be about 1-10 seconds, and the time window continually slides forward in time so that the sliding time window covers a most recent amount of data collected by the IMU over the past 1-10 seconds. The time window may be smaller or larger as well. The IMU data may be stored in persistent storage, or may be stored in a circular buffer such that newly received data overwrites the oldest data in the buffer, for example. Thus, the time window may indicate when data was collected by the IMU.

At block 404, the method 400 includes receiving images from a camera of the device for the sliding time window. For example, the camera may be configured to capture images during the sliding time window. In an example where the device includes a mobile phone having a rear facing camera, the camera may capture images in a field of view of the device for the sliding time window. In other examples where the device includes both a rear and a front facing camera, one or both cameras may be configured to capture images during the sliding time window. Any number of images may be captured within the time window, such as 1-3 images, for example, depending on a length of the time window. The camera may also be configured to capture live video during the time window, and frames of the video may be taken as images.

At block 406, the method 400 includes determining an IMU estimation of motion of the device based on the data from the IMU. As an example, a processor of the device may for the six degrees of freedom (e.g., x, y, z and $\theta_x$, $\theta_y$, and $\theta_z$) integrate the IMU acceleration data over time to determine a velocity. The processor may further integrate the velocity to determine a position. As a specific example, based on processing the IMU data, the processor may detect that the device traveled westward for an hour at an average speed of 1.5 miles per hour, and then the processor may determine that the device is about 1.5 miles west of its initial position or some starting, known, or reference position. The processor may determine an estimation of motion to be a path that the device traveled over the time period, for example. The estimation of motion may be along any of the six degrees of freedom (e.g., x, y, z and $\theta_x$, $\theta_y$, and $\theta_z$), or along a combination of any of the degrees of freedom. The estimation of motion may be in terms of changes in acceleration, velocity, position, or any combination of such factors.

At block 408, the method 400 includes determining a camera estimation of motion of the device based on feature tracking in the images. For example, the processor can determine an estimation of motion of the device based on the images captured by the camera. The images each can be processed to identify a set of features, or points in the images that a feature tracking algorithm can lock onto and follow through multiple frames. Example features points may be points in the image that are unique, bright/dark spots, or edges/corners depending on the particular tracking algorithm. For instance, an edge includes a point in an image where there is a boundary between two image regions, and a corner refers to point-like features in an image that have a local two-dimensional structure. Other algorithms such as the Harris & Stephens algorithm can be used to detect edges and corners. Still other methods may be used as well, such as feature detection from the Accelerated Segment Test (FAST) algorithm to detect corners and interest points, for example. Furthermore, features such as blobs may describe regions of interest in an image (e.g., regions that are too smooth to be detected by a corner detector), and the FAST algorithm, among others, can also be used to detect blobs as well.

One example feature tracking method includes the Kanade-Lucas-Tomasi (KLT) feature tracker method. In one instance, features are located by examining a minimum eigenvalue of each 2 by 2 gradient matrix of the image, and features can be tracked using a Newton-Raphson method of minimizing a difference between two windows of the images.

Once a feature is identified in consecutive images, an estimate of the motion of the device can be determined due to movement of the feature in the images. For example, if the feature is of a static object, then movement of the feature within the images is due to movement of the device. Within examples, when a difference between the images from the camera is more than a threshold amount, the images may be associated with corresponding data from the IMU for the sliding time window since the images have captured different features that may be tracked throughout the images.

In some examples, movement of features in the images between consecutive images can be determined and associated as movement of features representing a moving object in the images. When the features represent a moving object, the movement of features between images may not be due to movement of the device (or may be due to movement of the object and movement of the device), and thus, the feature tracking methods may not be accurate. As a result, features other than those associated with the moving object can be used for the feature tracking. When the features are associated with a static object, the features may be used for the feature tracking.

To distinguish features of moving objects from features of static objects within images, a motion model of all features can be compared. Features that exhibit a motion model varying from a motion model of a majority of features can be representative of features from moving objects. It may be considered that a majority of features in images are representative of static objects, and thus, outlier rejection can be performed to identify features of moving objects based on a motion model of those features having a considerable variance, for example.

Movement of features can be modeled using a translational motion model, where the feature undergoes a linear transformation. A translational motion model for a feature point x of a fixed window in the image may be described by the following function h.

$$h(x) = x + \Delta x \qquad \text{Equation (1)}$$

Movement of the feature can also be modeled using an affine motion model, which may be defined as:

$$h(x) = Dx + d \qquad \text{Equation (2)}$$

where D is a deformation matrix and d is a translation of a center of the window.

In other examples, to distinguish features of moving objects from features of static objects within images, other functions may be performed. When a feature is tracked between two images, it can be determined whether motion of the feature in the image plane is consistent with a shift that would occur if the feature is stationary and the device is moving. For this, a computed rotation of the device can be used based on measurements from the gyroscopes and the estimated direction of travel computed from a subset of tracked features. If a difference between the features actual location in a subsequent image and the expected location is larger than a threshold, then the feature may be identified as an outlier.

At block 410, the method 400 includes based on the IMU estimation of motion of the device and the camera estimation of motion of the device having a difference more than a threshold amount, determining one or more of a position or a velocity of the device for the sliding time window. The processor may be configured to compare each of the estimations of motion from the IMU data and the camera data to determine if there is a match within some threshold variance amount. For example, if the two estimations of motion are about the same, such as being within about a few centimeters of each other along a pathway of the motion or having approximately equal starting and ending locations, then a match may be determined. In this instance, both the IMU data and the camera images may be representative of the motion of the device.

To perform a comparison of the IMU estimation of motion of the device with the camera estimation of motion of the device, features in the images may be projected into an x,y coordinate frame in image space and may be linked to the IMU data based on timestamps of the respective data to match positions of the data. The camera images and IMU data that best explains a motion of the device may be determined if there is a match.

However, in instances in which the IMU estimation of motion of the device and the camera estimation of motion of the device vary more than the threshold amount, additional data may be determined to estimate motion of the device for the sliding time window. The additional data includes a position or a velocity of the device for the sliding time window. A position of the device may be determined from other sensors of the device including a GPS receiver, WiFi receiver, etc., or from other sensor data that may be processed to determine a geographic position of the device. A velocity of the device may also be determined based on data from other sensors or based on integration of data from other sensors.

In some examples, the camera estimation of motion of the device may indicate that the device is approximately stationary, such as for example, when all or many images are the same. In these examples, the method 400 may include determining the position or the velocity of the device with respect to a vertical axis and a horizontal axis of the device since the device may still be moving vertically or horizontally. For example, the device may be present on an elevator, and camera images would likely be the same during movement of the device along the vertical axis. The IMU data may indicate a movement; however, the camera images would not be representative of movement along a vertical axis. Thus, the additional positional information can be determined to verify the IMU data, for example. Another instance where the camera images may be about constant includes when the device is in a car or a train that is moving, and the device may capture the same images over time even though the device is moving horizontally along a path. The IMU data may be indicative of movement, and additional positional information can be determined to verify the IMU data. Thus, a geographic location of the device can be determined for the sliding time window based on one or more outputs from location-sensing sensors of the device.

At block 412, the method 400 includes determining an overall estimation of motion of the device for the sliding time window as supported by the data from the IMU and the one or more of the position or the velocity of the device. Within examples, the estimation of motion of the device determined based on the IMU data can be verified from the positional and/or velocity information of the device. The overall estimation of motion for the device can be determined over time as the sliding time window changes to encompass new time periods.

Figure 5:
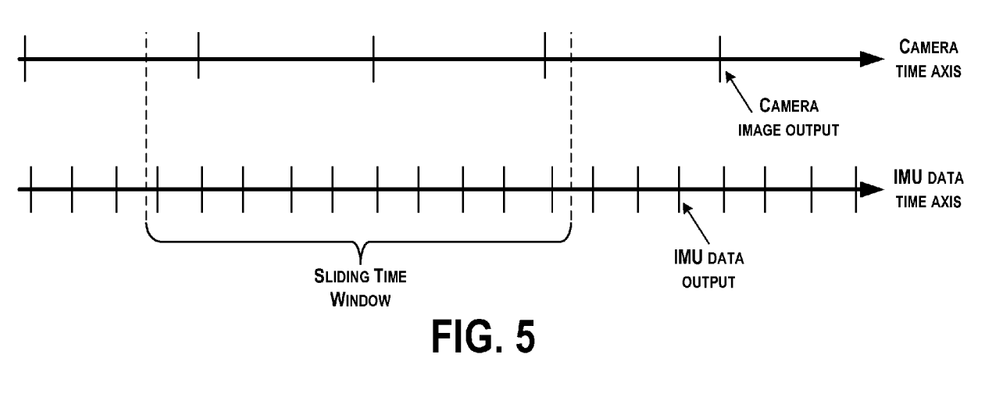
FIG. 5 illustrates an example time axis for each of a camera and an inertial measurement unit (IMU), and example outputs from the camera and IMU over the time axis.

FIG. 5 illustrates a conceptual time axis for each of a camera and an IMU, and outputs from the camera and IMU over the time axis. As shown, the IMU may be configured to provide outputs at a higher frequency than the camera. The sliding time window may be configured to be any time window, and in the example shown in FIG. 5, the sliding time window encompasses three camera images and seven IMU data outputs. The camera image outputs and the IMU data outputs can be linked or associated by timestamps of the data, for example, so as to associate an image with IMU data that were both collected at about the same time.

Figure 6A:
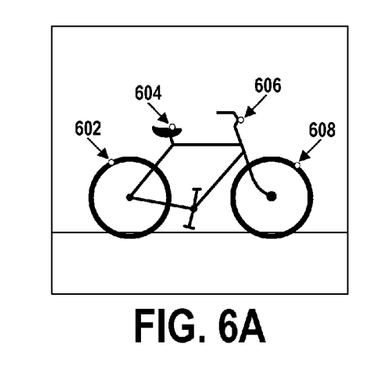
FIGS. 6A-6C illustrate example camera image outputs over a sliding time window.
Figure 6B:
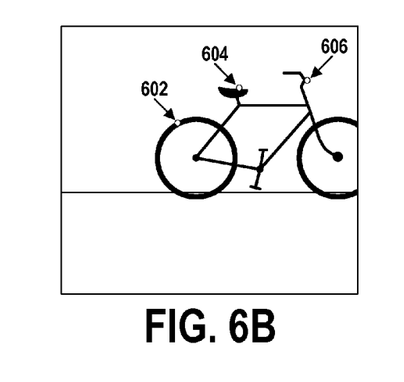
Figure 6C:
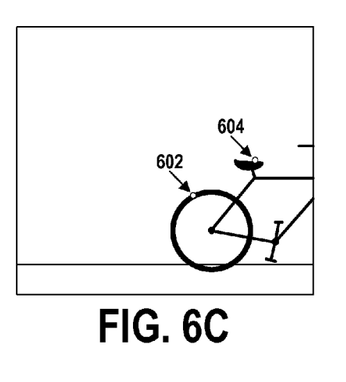

FIGS. 6A-6C illustrate example camera image outputs over a sliding time window. For example, three images are shown of a parked bicycle, and over the sliding time window, the device moved and captured the images shown. Content of the images varies due to movement of the device. In FIG. 6A, features of the image can be determined, and representative features include features 602, 604, 606, and 608. The features 602, 604, 606, and 608 in the images include specific points in the image that a tracking algorithm can lock onto and follow through multiple frames. The features 602, 604, 606, and 608 include bright or dark spots or edges of an object.

An edge detection technique may identify points in a digital image at which image brightness changes sharply or has discontinuities. The points at which image brightness changes sharply can be organized into a set of curved line segments termed edges. Corner detection is another approach used within computer vision systems to extract certain kinds of features and infer contents of an image, and a corner can be defined as an intersection of two edges. A corner can also be defined as a point for which there is two dominant and different edge directions in a local neighborhood of the point. Other feature detection methods include, blob detection, which refers to methods that are aimed at detecting regions in a digital image that differ in properties, such as brightness or color, compared to areas surrounding those regions.

As shown between FIG. 6A, FIG. 6B, and FIG. 6C, some of the features 602, 604, 606, and 608 are included in each image and a path of such common features may be determined. For example, features 602 and 604 are seen in all three images, and a path of the features can be determined. A path of the features 602 and 604 may be characterized by a linear transformation using a translational motion as described above.

Figure 7:
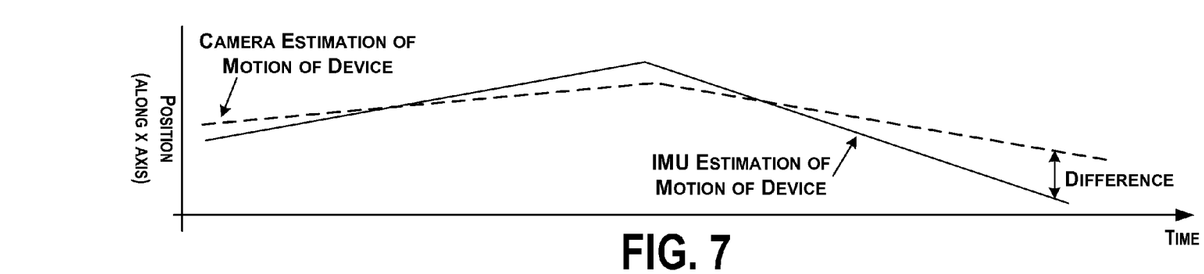
FIG. 7 is a conceptual illustration of example estimations of motion of the device based on camera images and IMU data.

FIG. 7 is a conceptual illustration of example estimations of motion of the device based on camera images and IMU data. As shown in FIG. 7, an example camera estimation of motion of the device has been determined using feature tracking of features in images (such as tracking the features in consecutive images shown in FIGS. 6A-6C). The estimation of motion is shown as a relative position along an x-axis over time. The graph further shows an estimation of motion of the device based on the IMU data, which varies at times from the camera estimation as shown by the difference. The difference may be tested at any time over the time scale, or at multiple instances along the time scale, or at a beginning and ending of a sliding time window, for example, so as to determine if the difference exceeds the threshold. Exceeding the threshold can be based on exceeding just once, exceeding at many times, etc., based on a desired accuracy of the estimations. In examples where the difference is larger than an threshold amount and exceeds a preset threshold (both in terms of magnitude and instances of threshold being exceeded), additional positional data can be determined.

Figure 8:
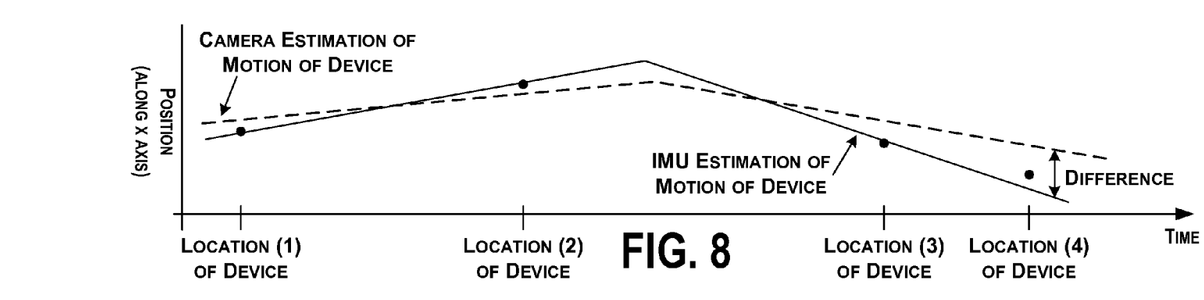
FIG. 8 is a conceptual illustration of example estimations of motion of the device based on camera images and IMU data, and additional positional data of the device over the time scale.

FIG. 8 is a conceptual illustration of example estimations of motion of the device based on camera images and IMU data, and additional positional data of the device over the time scale. For example, geographic locations of the device can be periodically determined as shown by the points in graph of Location (1), Location (2), Location (3), and Location (4). In this example, the positional data confirms or verifies the estimation of motion based on the IMU data since the data points are along or proximal to the line for the IMU estimation of motion.

Figure 9:
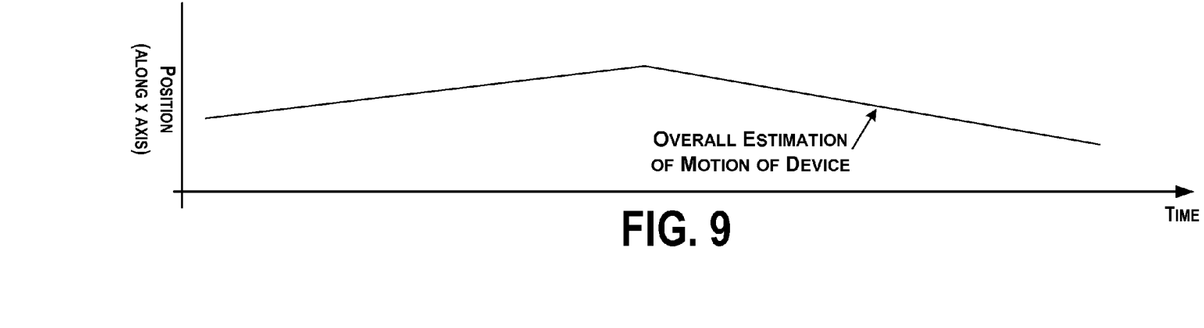
FIG. 9 is a conceptual illustration of an example overall estimation of motion of the device.

FIG. 9 is a conceptual illustration of an example overall estimation of motion of the device. In this example, the overall estimation of motion of the device can be the IMU estimation of motion slightly modified to take into account the variation in position as shown at Location (4) of the device as well as variation shown between the camera estimation of motion at various locations along the time scale. Modifications may include shaping the estimation to be an average of the camera estimation and the IMU estimation at any time frame at which the difference is more than a threshold, for example. Alternatively, the modifications may include causing the path to cross the data point(s) of the additional positional information (e.g., along Location (4)) at any time frames at which the difference is greater than the threshold.

Figure 10:
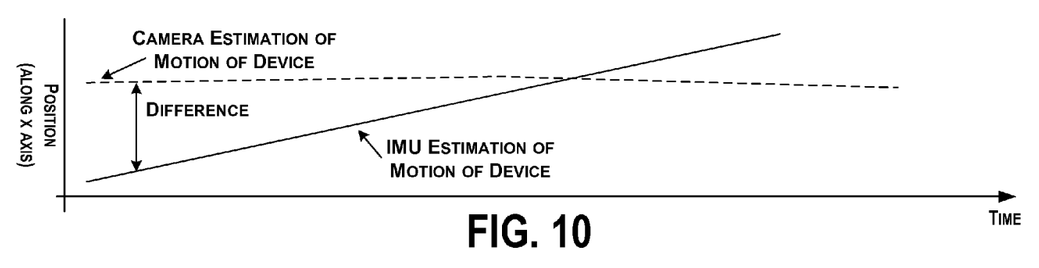
FIG. 10 is another conceptual illustration of example estimations of motion of the device based on camera images and IMU data.

FIG. 10 is another conceptual illustration of example estimations of motion of the device based on camera images and IMU data. In this example in FIG. 10, the camera estimation of motion is shown to be approximately static over time. For example, the images captured by the device may be about the same over time, which is indicative of the device not moving over the time period. FIG. 10 also illustrates IMU estimation of motion of the device as being approximately constant over time moving at a constant rate. FIG. 10 may illustrate an example in which the device is in a car and moving forward, however, the images being captured do not show any changes (e.g., the device is not moving within the car). Thus, from the graphical illustration in FIG. 10, there is a difference between the camera estimation of motion and the IMU estimation of motion, and the difference may exceed a given threshold at least during some time frames of a given sliding time window.

Figure 11:
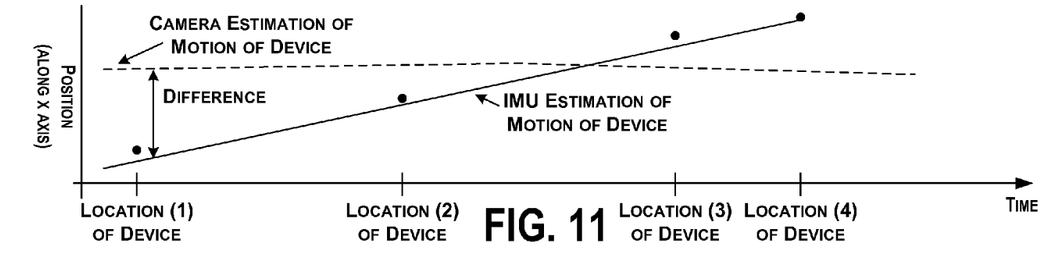
FIG. 11 is another conceptual illustration of example estimations of motion of the device based on camera images and IMU data, and additional positional data of the device over the time scale.

FIG. 11 is another conceptual illustration of example estimations of motion of the device based on camera images and IMU data, and additional positional data of the device over the time scale. In FIG. 11, since the difference between the camera estimation of motion and the IMU estimation of motion exceeded a threshold, additional positional data is determined and shown as data points on the graph of Location (1), Location (2), Location (3), and Location (4). In this example, the positional data points are approximately along the path of the IMU estimation of motion of the device.

Figure 12:
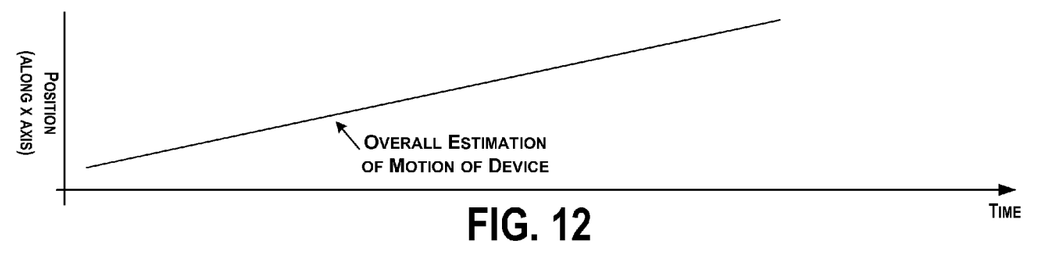
FIG. 12 is another conceptual illustration of an example overall estimation of motion of the device.

FIG. 12 is another conceptual illustration of an example overall estimation of motion of the device. In FIG. 12, the overall estimation of motion may be taken to be the IMU estimation of motion since the camera estimation of motion is static and the positional data supports the IMU estimation of motion.

Figure 13:
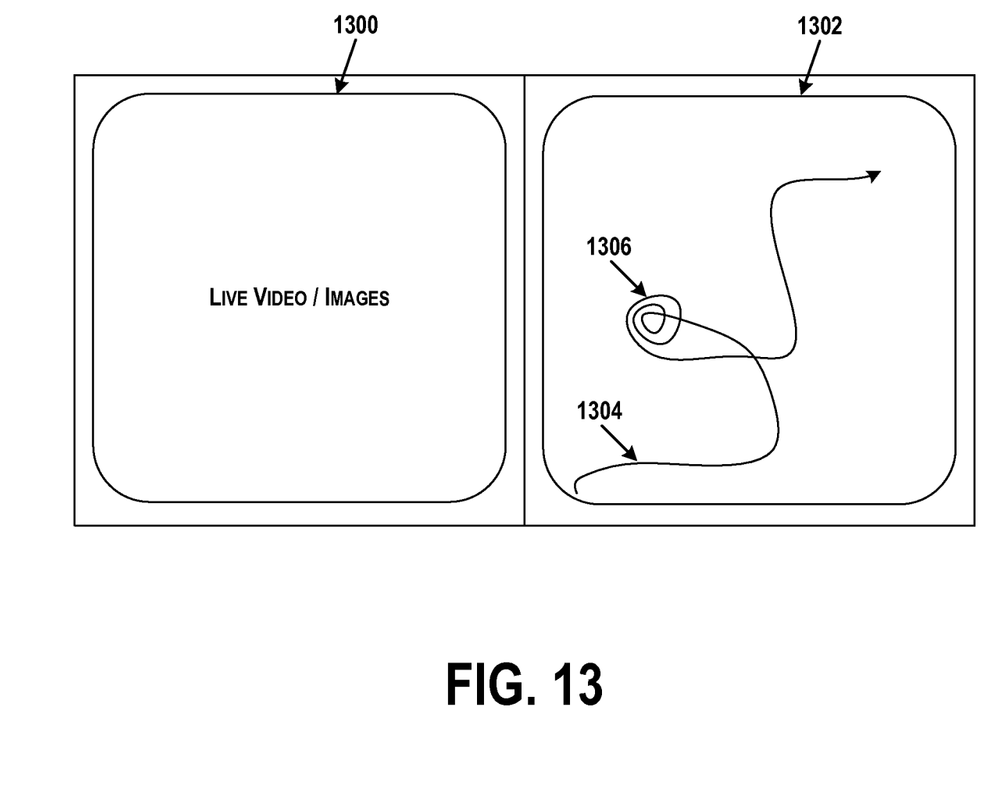
FIG. 13 is a display showing example side-by-side views of representations of motion of the device.

Within some examples, an estimation of motion of the device can be provided as a representation on a display. FIG. 13 is a display showing example side-by-side views of representations of motion of the device. The display may be a display of the device, or another display that receives data from the device. In FIG. 13, a portion 1300 of the display includes a live video feed or a display of images captured by the device. Another portion 1302 of the display includes a birds-eye representation 1304 of a pathway traversed by the device. The birds-eye representation 1304 may be a top-down perspective line representation (e.g., two-dimensional) of the overall estimation of motion of the device. The birds-eye representation 1304 shows the device moving along a path making turns, and at section 1306, the device may have moved vertically up a stairwell, for example.

Although the display shown in FIG. 13 is a side-by-side display, multiple separate displays may be provided as well. The display shown in FIG. 13 may be illustrative of motion of the device along one axis, and can be provided in real-time as well.

Within examples, images and IMU data can be collected and associated with a location of the device. At a first instance, a location of the device may not be known, and thus, the images and IMU data can be associated with a starting location of the device based on a first coordinate system in a frame of reference of the device. The starting location can be defined as coordinates (0, 0, 0), or some arbitrary space, and may be considered as an origin for the device. Once a recognition of features in the images with features having corresponding geographic locations and stored in a database is performed, the overall estimation of motion of the device can be modified to be in a second coordinate system based on respective geographic locations of the recognized features. For example, the device can perform object recognition of features in the images by sending the images to a server and receiving an identification of the object and a location of the object (e.g., a building located on a specific street). The frame of reference of the device and associated reference coordinates can be translated into the actual geographic reference coordinates of the identified object using a translational linear transform, for example.

In some instances, a geographic starting location may also be determined based on data from a GPS receiver or other location-based receiver, for example.

Within further examples, additional details of locations of the device can be determined based on the captured images and collected IMU data. In one example, gravity vectors can be determined from the data from the IMU so as to determine a direction of gravity with respect to an orientation of the device, and additional information can be received from a depth camera of the device. Features in the information from the depth camera representative of a floor can be determined based on the features in the information from the depth camera being perpendicular to the gravity vectors. Once an estimate of a location of the floor is determined, then an estimate of a height of the device based on a distance to the floor can also be determined.

In another example, a pose or orientation of the camera of the device for the sliding time window can be determined based on the overall estimation of motion of the device. The IMU data may indicate yaw, pitch, and roll of the device, and the camera is in a fixed position with respect to the device. Thus, using the fixed relative position of the camera and the IMU data, an orientation of the camera can be determined. This may be helpful, for example, in instances in which features in the images may be representative of objects upside down or otherwise angled with respect to the camera, and the pose/orientation can be used to translate the images to be upright for feature tracking purposes.

Within examples, a computing device can be configured to perform motion tracking based on outputs from available sensors of the computing device. As an example, an odometry estimator of the device may be configured to utilize any outputs from available sensors so as to generate an estimation of motion of the computing device. For instance, the computing device may be located in a pocket or a backpack that obstructs a lens of the camera, and thus, image data may not be useful. The computing device can be configured to switch to a motion profile other methods of motion tracking, such as step counting or outputs from the IMU, GPS receiver, barometer, etc. The odometry estimates may be configured to degrades in accuracy of estimation of motion as sensor data becomes unavailable. In examples where cameras are obstructed, WiFi/Bluetooth systems are out of range of access points, etc., the odometry estimator may still produce an estimation of position with outputs from available sensors. The estimation may be associated with a probability given all observations and outputs from available sensors or a confidence level given uncertainty or noise in sensor outputs.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving data from an inertial measurement unit (IMU) of a device for a sliding time window;
receiving images from a camera of the device for the sliding time window;
determining an IMU estimation of motion of the device based on the data from the IMU;
determining a camera estimation of motion of the device based on feature tracking in the images;
determining, from the camera estimation of motion, an indicator of the device being approximately stationary;
in response to the indicator of the device being approximately stationary, determining one or more of a position or a velocity of the device for the sliding time window using information from a component of the device other than the IMU; and
determining an overall estimation of motion of the device for the sliding time window as supported by the data from the IMU and the one or more of the position or the velocity of the device.

2. The method of claim 1, further comprising associating the images from the camera for the sliding time window with data from the IMU for matching time periods of the sliding time window.

3. The method of claim 2, further comprising:
based on a difference between the images from the camera being more than a threshold amount, associating the images from the camera for the sliding time window with corresponding data from the IMU for the sliding time window.

4. The method of claim 1, wherein:
determining one or more of a position or a velocity of the device for the sliding time window comprises determining the one or more of the position or the velocity of the device with respect to a vertical axis and a horizontal axis of the device.

5. The method of claim 1, wherein determining one or more of a position or a velocity of the device for the sliding time window comprises determining a geographic location of the device for the sliding time window based on the information from the component of the device other than the IMU.

6. The method of claim 1, further comprising;
determining movement of one or more features in the images from the camera between consecutive images;
associating the one or more features with a moving object; and
using features other than the one or more features associated with the moving object for the feature tracking.

7. The method of claim 1, further comprising;
determining movement of one or more features in the images from the camera between consecutive images;
associating the one or more features with a static object; and
using the one or more features associated with the static object for the feature tracking.

8. The method of claim 1, further comprising:
providing for display a video feed of the device based on the images from the camera; and
providing for display a top-down perspective line representation of the overall estimation of motion of the device.

9. The method of claim 1, further comprising:
determining a starting location of the device based on a first coordinate system in a frame of reference of the device; and
based on a recognition of one or more features in the images with features having corresponding geographic locations and stored in a database, modifying the overall estimation of motion of the device to be in a second coordinate system based on respective geographic locations of the one or more recognized features.

10. The method of claim 1, further comprising:
determining gravity vectors from the data from the IMU of the device;
receiving information from a depth camera of the device;
determining features in the information from the depth camera representative of a floor based on the features in the information from the depth camera being perpendicular to the gravity vectors; and
determining an estimate of a height of the device based on a distance to the floor.

11. The method of claim 1, further comprising determining a pose of the camera of the device for the sliding time window based on the overall estimation of motion of the device.

12. The method of claim 1, further comprising determining the overall estimation of motion for the device over time as the sliding time window changes to encompass new time periods.

13. The method of claim 1, wherein the device includes a plurality of sensors, and wherein determining the overall estimation of motion of the device for the sliding time window comprises determining the overall estimation of motion of the device based also on outputs from the plurality of sensors.

14. The method of claim 13, further comprising:
based on an output from a given sensor of the plurality of sensors being unavailable, determining the overall estimation of motion of the device based on given outputs from sensors of the plurality of sensors that are available.

15. A non-transitory computer readable memory configured to store instructions that, when executed by a device, cause the device to perform functions comprising:
receiving data from an inertial measurement unit (IMU) of the device for a sliding time window;
receiving images from a camera of the device for the sliding time window;
determining an IMU estimation of motion of the device based on the data from the IMU;
determining a camera estimation of motion of the device based on feature tracking in the images;
determining, from the camera estimation of motion, an indicator of the device being approximately stationary;
in response to the indicator of the device being approximately stationary,
determining one or more of a position or a velocity of the device for the sliding time window using information from a component of the device other than the IMU; and
determining an overall estimation of motion of the device for the sliding time window as supported by the data from the IMU and the one or more of the position or the velocity of the device.

16. The non-transitory computer readable memory of claim 15, wherein:
determining one or more of a position or a velocity of the device for the sliding time window comprises determining the one or more of the position or the velocity of the device with respect to a vertical axis and a horizontal axis of the device.

17. The non-transitory computer readable memory of claim 15, wherein the functions further comprise:
determining a starting location of the device based on a first coordinate system in a frame of reference of the device; and
based on a recognition of one or more features in the images with features having corresponding geographic locations and stored in a database, modifying the overall estimation of motion of the device to be in a second coordinate system based on respective geographic locations of the one or more recognized features.

18. A device comprising:
one or more processors; and
data storage configured to store instructions that, when executed by the one or more processors, cause the device to perform functions comprising:
receiving data from an inertial measurement unit (IMU) of the device for a sliding time window;
receiving images from a camera of the device for the sliding time window;
determining an IMU estimation of motion of the device based on the data from the IMU;
determining a camera estimation of motion of the device based on feature tracking in the images;
determining, from the camera estimation of motion, an indicator of the device being approximately stationary;
in response to the indicator of the device being approximately stationary, determining one or more of a position or a velocity of the device for the sliding time window using information from a component of the device other than the IMU; and
determining an overall estimation of motion of the device for the sliding time window as supported by the data from the IMU and the one or more of the position or the velocity of the device.

19. The device of claim 18, wherein the functions further comprise determining a pose of the camera of the device for the sliding time window based on the overall estimation of motion of the device.

20. The device of claim 18, further comprising:
a plurality of sensors, and
wherein determining the overall estimation of motion of the device for the sliding time window comprises determining the overall estimation of motion of the device based also on outputs from the plurality of sensor, and
based on an output from a given sensor of the plurality of sensors being unavailable, determining the overall estimation of motion of the device based on given outputs from sensors of the plurality of sensors that are available.

21. The device of claim 18, further comprising:
the component of the device other than the IMU, wherein the component comprises at least one of: a global positioning system (GPS) component; a wi-fi component; and a near field communications (NFC) component.

* * * * *